United States Patent [19]

Yukishige et al.

[11] Patent Number: 5,571,859

[45] Date of Patent: Nov. 5, 1996

[54] ANTISTATIC COMPOSITION, RESIN COMPOSITION AND MOLDED ARTICLE OF THE RESIN COMPOSITION

[75] Inventors: Hidenori Yukishige; Yuji Koshima; Hajime Tanisho, all of Yokohama; Teiji Kohara, Kawasaki, all of Japan

[73] Assignee: Nippon Zeon Co., Ltd., Tokyo, Japan

[21] Appl. No.: 330,861

[22] Filed: Oct. 27, 1994

[30] Foreign Application Priority Data

Oct. 29, 1993 [JP] Japan .................................. 5-294179

[51] Int. Cl.$^6$ ................................ C08J 5/06; C08K 3/04; C08L 19/00
[52] U.S. Cl. .......................... 524/496; 524/495; 524/910; 524/911
[58] Field of Search ..................... 524/495, 496, 524/910, 911, 912, 913

[56] References Cited

U.S. PATENT DOCUMENTS 5,321,071  6/1994  Fujisawa et al. ........................ 524/496

FOREIGN PATENT DOCUMENTS 5-156100  6/1993  Japan .

*Primary Examiner*—Paul R. Michl
*Assistant Examiner*—U. K. Rajguru
*Attorney, Agent, or Firm*—Armstrong, Westerman, Hattori, McLeland & Naughton

[57] ABSTRACT

A resin composition comprising 100 parts by weight of a thermoplastic resin and 1 to 50 parts by weight of an antistatic composition consisting essentially of 100 parts by weight of carbon fibers having a length of 0.01 to 100 mm and 5 to 70 parts by weight of carbon fibers having a length of ½ to 1/100 of the first carbon fibers is molded to obtain a molded article having an even antistatic effect over the surface in which molded article the antistatic agent (carbon fibers) does not bleed to the exterior and the antistatic effect is maintained for a long time.

17 Claims, No Drawings

ANTISTATIC COMPOSITION, RESIN COMPOSITION AND MOLDED ARTICLE OF THE RESIN COMPOSITION

BACKGROUND OF THE INVENTION

This invention relates to an antistatic composition for a thermoplastic resin which does not adversely affect the environment by the bleeding or the like of impurities or the like, the antistatic effect of the antistatic composition being exhibited uniformly over the surface of a molded article from the thermoplastic resin and retained for a long time.

In order to improve the antistatic properties of a thermoplastic resin molded article, the addition of various antistatic agents to the thermoplastic resin has been tried. However, conventional antistatic agents have their own problems and, in some uses, they could not meet the required performance.

Representative conventional antistatic agents are surfactant, carbon black, metal whisker, carbon fiber and the like. The surfactant becomes a cause of bleeding, and in this case, impurities are bled in some cases and the antistatic effect is not retained for a long time. Carbon black bleeds from the wounded portion of a molded article in some cases. In the case of metal whisker, the metal bleeds in some cases. Moreover, long carbon fiber has orientation, and hence, the antistatic effect becomes uneven even on the same molded article surface. In the case of short carbon fiber, the antistatic effect is small when they are added in a small amount while, when they are added in a large amount, the amount of impurities is also increased and the impurities bleed in some cases. Therefore, when a thermoplastic resin is applied to uses in which it is desirable for any material not to bleed as in, for example, a wafer carrier for the production of a semiconductor, it has been impossible to prevent the uneven antistatic effect and to retain the antistatic effect for a long time.

The present inventors have made extensive research for allowing a thermoplastic resin molded article to have a preferable antistatic effect, and have, as a result, found that when two kinds of carbon fibers having a specific length are compounded with a thermoplastic resin, a thermoplastic resin molded article having an even antistatic effect over its whole surface is obtained.

SUMMARY OF THE INVENTION

It is an object of this invention to provide an antistatic composition capable of giving an even antistatic effect the whole surface of a molded article formed from a thermoplastic resin composition containing the antistatic composition.

It is a further object of this invention to provide a resin composition comprising the antistatic composition and capable of yielding a molded article having good antistatic properties.

It is a still further object of this invention to provide a molded article formed from the resin composition.

Other objects and advantages of this invention will become apparent from the following description.

According to this invention, there are provided an antistatic composition which consists essentially of 100 parts by weight of carbon fibers having a length of 0.01 to 100 mm and 5 to 70 parts by weight of carbon fibers having a length of ½ to ¹/₁₀₀ of the length of the first carbon fibers, a resin composition comprising 100 parts by weight of a thermoplastic resin and 1 to 50 parts by weight of the above antistatic composition and a molded article consisting of the above resin composition.

DETAILED DESCRIPTION OF THE INVENTION (Antistatic composition)

The antistatic composition of this invention consists of at least two components, one component of which is carbon fibers having a length of 0.01 to 100 mm, preferably 0.1 to 50 mm, more preferably 0.5 to 10 mm (said one component is referred to hereinafter as the component A) and another component of which is carbon fibers having ½ to ¹/₁₀₀, preferably ⅓ to ¹/₅₀, more preferably ¼ to ¹/₁₀ of the length of the component A (said another component is referred to hereinafter as the component B). The proportion of the component B is 5 to 70 parts by weight, preferably 10 to 60 parts by weight, more preferably 15 to 50 parts by weight, per 100 parts by weight of the component A. Also, the carbon fibers of the components A and B are those having a diameter of, preferably 0.001 to 100 μm, more preferably 0.1 to 50 μm, particularly preferably 1 to 30 μm. The production method is not critical and there may be used any of the rayon carbon fiber, polyacrylonitrile carbon fiber, pitch carbon fiber and vapor growth carbon fiber and the like.

When the carbon fibers of the components A and B are too short, the antistatic effect becomes insufficient, and when they are too long, the antistatic effect becomes uneven in some cases. When the component B carbon fiber is too longer or too shorter than the component A carbon fiber, the antistatic effect becomes insufficient. Also, when the amount of the component B is much smaller than the amount of the component A, the antistatic effect becomes insufficient, when the amount of the component B is much larger than the amount of the component A, the antistatic effect becomes uneven in some cases. When the diameters of the carbon fibers are too small, the antistatic effect becomes insufficient, and when the diameters are too large, the antistatic effect becomes uneven in some cases. Incidentally, the carbon fibers of the components A and B need not have the same diameters and need not be produced by the same production method.

[Thermoplastic Resin]

The thermoplastic resin used in this invention is not critical, and there can be used, for example, polyethylene, polypropylene, polycarbonate, acrylic resin, polystyrene, ABS resin, PPS resin, thermoplastic norbornene resin and the like. Among them, the thermoplastic norbornene resin is preferably used because it is excellent in moisture resistance, water resistance, chemical resistance, thermal resistance and various electrical characteristics.

The thermoplastic norbornene resins are resins which are known in Japanese Patent Application Kokai Nos. 51-80,400; 60-26,024; 1-168,725; 1-190,726; 3-14,882; 3-122,137 and 4-63,807 and the like, and include specifically ring-opening polymers of norbornene monomers, their hydrogenation products, addition polymers of norbornene monomers, addition copolymers of norbornene monomers and olefins and the like. The norbornene monomers are monomers which are known in the above-mentioned Japanese publications and Japanese Patent Application Kokai Nos. 2-227,424 and 2-276,842 and include, for example, norbornene; alkyl-substituted, alkylidene-substituted and aromatic-substituted derivatives of norbornene, for example, 2-norbornene, 5-methyl-2-norbornene, 5,5-dimethyl-2-norbornene and the like; polar group-substituted products of norbornene and of said substituted derivatives of norbornene, said polar group being, for example, halogen atom, hydroxyl group, ester group, alkoxy group, cyano group, amido group, imido group; norbornene having added thereto at least one cyclopentadiene; the same derivatives and substituted products as mentioned above of the norbornene having added thereto at least one cyclopentadiene, for example, 1,4:5,8-dimethano-2,3-cyclopentadieno-1,2,3,4,4a,5,8,8a-octahydronaphthalene, 6-methyl-1,4:5,8-dimethano-1,4,4a,5,6,7,8,8a-octahydronaphthalene and the like; polycyclic structure monomers which are polymers of cyclopentadiene and the same derivatives and substituted products as above of the polycyclic structure monomers, for example, dicyclopentadiene, 2,3-dihydrodicyclopentadiene and the like; adducts of cyclopentadiene to tetrahydroindene and the like and the same derivatives and substituted products as above of the adducts, for example, 1,4-methano-1,4,4a,4b,5,8,8a,9a-octahydrofluorene, 5,8-methano-2,3-cyclopentadieno-1,2,-3,4,4a,5,8,8a-octahydronaphthalene and the like; etc.

The polymerization of the norbornene monomer may be effected by any known method. Other copolymerizable monomers may, if necessary, be copolymerized therewith. The resulting polymer or copolymer may be hydrogenated to obtain a hydrogenated thermoplastic norbornene polymer or copolymer which is a thermoplastic saturated norbornene resin. Also, the above polymer or copolymer or the above hydrogenated polymer or copolymer may be modified with an α,β-unsaturated carboxylic acid and/or its derivative, a styrenic hydrocarbon, an organosilicon compound having an olefinically unsaturated bond and a hydrolyzable group or an unsaturated epoxy monomer. Incidentally, in order to obtain a molded article having excellent moisture resistance and chemical resistance, polar group-free thermoplastic norbornene resins are preferred.

In this invention, the number average molecular weight of the thermoplastic norbornene resin is preferably 10,000 to 200,000, more preferably 15,000 to 100,000 and most preferably 20,000 to 50,000 in terms of polystyrene-reduced value as measured by gel permeation chromatography (GPC) using a toluene solvent. When the thermoplastic norbornene resin has an unsaturated bond in the molecular structure, said resin can be converted to a thermoplastic saturated norbornene resin by hydrogenation. In the case where hydrogenation is effected, the degree of hydrogenation is preferably at least 90%, more preferably at least 95%, and most preferably at least 99% in view of heat deterioration resistance, photodeterioration resistance and the like.

To the thermoplastic resin may be added such various additives that the purpose of this invention is not impaired. For example, in the case of the thermoplastic norbornene resin, there may be added various additives, for example, antioxidants of phenol type, phosphorus type and the like; heat deterioration inhibitors of phenol type and the like; ultraviolet ray stabilizers of benzophenone type and the like; lubricants such as esters of aliphatic alcohols, partial esters of polyhydric alcohols, partial ethers of polyhydric alcohols and the like; etc. Other resins, rubbers and the like may be used in admixture. For example, a fluororesin may be mixed therewith in order to increase the slidability and to inhibit shavings from being caused.

[Resin Composition]

The resin composition of this invention comprising 100 parts by weight of a thermoplastic resin and 1 to 50 parts by weight, preferably 10 to 40 parts by weight, more preferably 15 to 30 parts by weight, of the antistatic composition of this invention. When the amount of the antistatic composition is too small, the antistatic effect is insufficient, and in some cases unevenness is caused. When the amount of the antistatic composition is too large, the resin composition becomes conductive, and when such a conductive resin composition is used as an electronic part carrier, there are caused short circuit and the like in some cases.

[Molded Article]

The resin composition of this invention is molded to obtain the molded article of this invention. The molding method is not critical, and there can be used general methods of molding thermoplastic resins such as injection molding, melt extrusion, hot pressing, solvent casting, stretching and the like.

In general, the antistatic effect can be indicated by surface resistance value, and the surface resistance value of the molded article of this invention is $10^3$ to $10^{14}$ Ω, preferably $10^4$ to $10^{13}$ Ω, more preferably $10^5$ to $10^{12}$ Ω, and any portion of the surface of the molded article indicates substantially the same value and the surface resistance is even. For example, when the surface resistance of a plate-shaped molded article is measured at 100 spots or more per area of 10 cm×20 cm or so, all the values obtained fall within the average value ±20%, preferably ±10%. When the surface resistance is too small, i.e. less than $10^3$ Ohms, the molded article becomes to conductive, and hence, becomes unusable in uses requiring an antistatic insulating effect. On the other hand, when the surface resistance is too high, the antistatic effect becomes insufficient. Incidentally, as mentioned above, generally, the antistatic effect can be indicated by surface resistance value; however, the two are essentially not the same, and when the surface resistance is larger than $10^{13}$ Ω, the antistatic effect is not better. The actual antistatic effect is measured by a tobacco ash-attraction test. In this test, a test specimen is rubbed with a gauze, and then brought near fresh tobacco ash to determine the height at which the ash starts to be attracted. The molded article of this invention starts to attract tobacco ash at a height of 1 cm or less, preferably 0.5 cm or less, more preferably 0.1 cm or less. Where the composition is sufficiently kneaded, there is no problem; however, in the case of a molded article having a surface resistance value ranging from $10^{13}$ to $10^{14}$ Ω, the antistatic effect becomes insufficient depending upon the degree of kneading, the length of carbon fibers and the shape of molded article in some cases.

The shape of the molded article is not critical and may be the shape necessary for the purpose of use. For example, when a thermoplastic norbornene resin is used as the thermoplastic resin, the resin composition of this invention is excellent in antistatic effect, heat resistance, water resistance, moisture resistance, chemical resistance, low organic matter extractability and the like, so that the resin composition can be used as an excellent performance electronic part carrier by molding the composition into a shape suitable as an electronic part carrier such as IC carrier, wafer carrier, information recording medium carrier, printed wiring board carrier, carrier table or the like.

DESCRIPTION OF THE PREFERRED EMBODIMENTS

This invention is explained in more detail below referring to Reference Examples, Examples and Comparative Examples.

REFERENCE EXAMPLE 1

To 100 parts by weight of a thermoplastic norbornene resin (ZEONEX 280 manufactured by Nippon Zeon Co., Ltd., number average molecular weight: about 28,000, degree of hydrogenation: approximately 100%, glass transition temperature: 140° C.) were added 0.2 part by weight of pentaerythrityl-tetrakis[3-(3,5-di-tert-butyl)-4-hydroxyphenyl]propionate which was a phenolic antioxidant and 20 parts by weight of polytetrafluoroethylene powder which was a slidability enhancing agent, and the resulting mixture was melt-extruded at 240° C. using a twin screw kneader (TEM-35 manufactured by Toshiba Machine Co., Ltd.) to obtain pellets.

EXAMPLE 1

Twenty parts by weight of pitch carbon fibers (KRECA CHOP M-207S manufactured by Kureha Chemical Industry Co., Ltd.) having a diameter of 14.5 μm and a length of 700 μm was mixed with 10 parts by weight of pitch carbon fibers (KRECA CHOP M-201F manufactured by Kureha Chemical Industry Co., Ltd.) having a diameter of 18 μm and a length of 130 μm to prepare an antistatic composition which is the present antistatic composition.

EXAMPLE 2

Thirty parts by weight of the antistatic composition obtained in Example 1 was mixed with 100 parts by weight of the pellets obtained in Reference Example 1, and the resulting mixture was melt-extruded at 240° C. using a twin screw kneader (TEM-35) to obtain resin composition pellets which are the present resin composition.

EXAMPLE 3

The pellets obtained in Example 2 were injection-molded under the following conditions to obtain a test specimen in the form of a plate having a thickness of 3 mm, a length of 110 mm and a width of 220 mm:

Molding machine: IS-350FB-19A manufactured by Toshiba Machine Co., Ltd.

Clamping pressure:80 t

Resin temperature:280° C.

Mold temperature:100° C. on both fixed mold and movable mold sides

Each of the points at an interval of 10 mm in the longitudinal direction and at an interval of 20 mm in the transverse direction on the test specimen (100 points in total) was taken as a center and the surface resistance was measured in the transverse distance of 20 mm from the center to obtain an average value of $2\times10^6$ Ω, a maximum value of $2.4\times10^6$ Ω and a minimum value of $2.1\times10^6$ Ω. Also, the test specimen was rubbed 30 times with a gauze and thereafter subjected to a tobacco ash attraction test in which the specimen was brought near fresh tobacco ash. No tobacco ash was attracted even at a 0.1-cm height.

In a hard glass flask was placed 200 g of distilled water, and the glass flask was covered with a lid made of hard glass. The flask was subjected to steam-sterilization treatment at 120° C. for one hour using an autoclave, cooled to room temperature and thereafter allowed to stand for 24 hours, after which the distilled water was recovered.

Moreover, a test specimen was subjected to ultrasonic washing in distilled water for 20 minutes, and thereafter, dried at 40° C. for ten hours and cut to an appropriate size. A 20-g portion of the cut test specimen was placed in a hard glass flask and 200 g of distilled water was placed in the hard glass flask, after which the hard glass flask was covered with a lid made of hard glass. The flask was subjected to steam-sterilization treatment at 120° C. for one hour using an autoclave, cooled to room temperature, and thereafter, allowed to stand for 24 hours, after which the distilled water was recovered.

Said two kinds of distilled water were subjected to measurement of the amount of carbon atoms leached from the test specimen to find that the amount of inorganic carbon was less than 1 ppm (detection limit) and the amount of organic carbon was less than 2 ppm (detection limit).

EXAMPLE 4

An antistatic composition was obtained in the same manner as in Example 1, except that pitch carbon fibers (KRECA CHOP M-203S manufactured by Kureha Chemical Industry Co., Ltd.) having a diameter of 14.5 μm and a length of 3.0 μm was substituted for the pitch carbon fibers having a diameter of 14.5 μm and a length of 700 μm, and thereafter, a resin composition was prepared in the same manner as in Example 2, except that the above antistatic composition was substituted for the antistatic composition obtained in Example 1. Further, a test specimen was prepared in the same manner as in Example 3, except that the above resin composition was substituted for the resin composition obtained in Example 2. The surface resistance of the test specimen obtained was measured to find that the average value was $9.8\times10^5$ Ω, the maximum value was $1.1\times10^6$ Ω and the minimum value was $9.0\times10^5$ Ω. In the tobacco ash attraction test, no tobacco ash was attracted even at a 0.1-cm height. Also, the amount of carbon atoms dissolved out of the test specimen was such that the amount of inorganic carbon was less than 1 ppm (detection limit) and the amount of the organic carbon was less than 2 ppm (detection limit).

EXAMPLE 5

An antistatic composition was prepared in the same manner as in Example 1, except that pitch carbon fibers (KRECA CHOP M-2007S manufactured by Kureha Chemical Industry Co., Ltd.) having a diameter of 1.45 μm and a length of 70 μm was substituted for the pitch carbon fibers having a diameter of 18 μm and a length of 130 μm, and thereafter, a resin composition was prepared in the same manner as in Example 2, except that the above antistatic composition was substituted for the antistatic composition obtained in Example 1. Further, a test specimen was prepared in the same manner as in Example 3, except that the above resin composition was substituted for the resin composition obtained in Example 2. The surface resistance of the test specimen was measured to find that the average value was $5.6\times10^7$ Ω, the maximum value was $5.9\times10^7$ Ω and the minimum value was $5.4\times10^7$ Ω. In the tobacco ash attraction test, no tobacco ash was attracted even at a 0.1-cm height. Also, the amount of carbon atoms dissolved out of the test specimen was such that the amount of inorganic carbon was less than 1 ppm (detection limit) and the amount of organic carbon was less than 2 ppm (detection limit).

EXAMPLE 6

A resin composition was prepared in the same manner as in Example 2, except that the antistatic composition obtained in Example 1 was replaced by an antistatic composition prepared by mixing 50 parts by weight of pitch carbon fibers (KRECA CHOP M-207S) having a diameter of 14.5 μm and a length of 700 μm with 10 parts by weight of pitch carbon fibers (KRECA CHOP M-201F), and a test specimen was prepared in the same manner as in Example 3, except that the resin composition obtained above was substituted for the resin composition obtained in Example 2, and subjected to measurement of surface resistance to find that the average value was $3.1 \times 10^{10}$ Ω, the maximum value was $3.4 \times 10^{10}$ Ω, and the minimum value was $2.5 \times 10^{10}$ Ω. In the tobacco ash attraction test, no tobacco ash was attracted even at a 0.1-cm height. Also, the amount of carbon atoms dissolved out of the test specimen was such that the amount of inorganic carbon was less than 1 ppm (detection limit) and the amount of organic carbon was less than 2 ppm (detection limit).

COMPARATIVE EXAMPLE 1

A test specimen was prepared in the same manner as in Example 3, except that the pellets obtained in Reference Example 1 was substituted for the pellets obtained in Example 2 and subjected to measurement of surface resistance to find that the average value was $6.7 \times 10^{13}$ Ω, the maximum value was $7.0 \times 10^{13}$ Ω and the minimum value was $6.2 \times 10^{13}$ Ω. In the tobacco ash attraction test, the tobacco ash was attracted at a height of about 1.5 cm. Also, the amount of carbon atoms dissolved out of the test specimen was such that the amount of inorganic carbon was less than 1 ppm (detection limit) and the amount of organic carbon was less than 2 ppm (detection limit).

COMPARATIVE EXAMPLE 2

To 100 parts by weight of the pellets obtained in Reference Example 1 was added 30 parts by weight of pitch carbon fibers (KRECA CHOP M-207S) having a diameter of 14.5 μm and a length of 700 μm, and the resulting mixture was melt-extruded at 240° C. using a twin screw kneader (TEM-35) to obtain resin composition pellets which are the present resin composition.

A test specimen was prepared in the same manner as in Example 3, except that the pellets obtained above were substituted for the pellets obtained in Example 2 and subjected to measurement of surface resistance to find that the average value was $4.6 \times 10^{13}$ Ω, the maximum value was $4.9 \times 10^{13}$ Ω and the minimum value was $3.8 \times 10^{13}$. In the tobacco ash attraction test, the tobacco ash was attracted at a height of about 0.9 cm. Also, the amount of carbon atoms dissolved out of the test specimen was such that the amount of inorganic carbon was less than 1 ppm (detection limit) and the amount of organic carbon was less than 2 ppm (detection limit).

COMPARATIVE EXAMPLE 3

The same procedure as in Comparative Example 2 was repeated, except that the pitch carbon fibers having a diameter of 14.5 μm and a length of 700 μm was replaced by pitch carbon fibers (KRECA CHOP M-201F) having a diameter of 18 μm and a length of 130 μm to prepare a test specimen, and this test specimen was subjected to measurement of surface resistance to find that the average value was $3 \times 10^{12}$ Ω, the maximum value was $2.3 \times 10^{13}$ Ω and the minimum value was $8.3 \times 10^{7}$ Ω. In the tobacco ash attraction test, tobacco ash was attracted at about 0.9-cm height. Also, the amount of carbon atoms dissolved out of the test specimen was such that the amount of inorganic carbon was less than 1 ppm (detection limit) and the amount of organic carbon was less than 2 ppm (detection limit).

What is claimed is:

1. A resin composition which comprises 100 parts by weight of a thermoplastic resin and 1 to 50 parts by weight of an antistatic composition consisting essentially of (a) 100 parts by weight of carbon fibers having a length of 0.01 to 100 mm and (b) 5 to 70 parts by weight of carbon fibers having a length of ½ to ¹⁄₁₀₀ of the length of the carbon fibers (a).

2. The resin composition according to claim 1, wherein the amount of the antistatic composition is 10 to 40 parts by weight.

3. The resin composition according to claim 1, wherein the amount of the antistatic composition is 15 to 30 parts by weight.

4. The resin composition according to claim 1, wherein the thermoplastic norbornene resin is free of a polar group.

5. The resin composition according to claim 1, wherein the thermoplastic norbornene resin has a polystyrene-reduced number average molecular weight of 10,000 to 200,000 as measured by gel permeation chromatography.

6. The resin composition according to claim 4, wherein the polystyrene-reduced number average molecular weight is 15,000 to 100,000.

7. The resin composition according to claim 4, wherein the polystyrene-reduced number average molecular weight is 20,000 to 50,000.

8. The resin composition according to claim 1, wherein the thermoplastic norbornene resin is a ring opening polymer of a norbornene monomer, its hydrogenated product, an addition polymer of a norbornene monomer or an addition copolymer of a norbornene monomer and an olefin.

9. The resin composition according to claim 7, wherein the norbornene monomer is at least one member selected from the group consisting of 2-norbornene, 5-methyl-2-norbornene, 5,5-dimethyl-2-norbornene, 1,4:5,8-dimethano-2,3-cyclopentadieno-1,2,3,4,4a,5,8,8a-octahydronaphthalene, dicyclopentadiene, 2,3-dihydrodicyclopentadiene, 1,4-methano-1,4,4a,4b,5,8,8a,9a-octahydrofluorene, 5,8-methano-2,3-cyclopentadieno-1,2,3,4,4a,5,8,8a-octahydronaphthalene.

10. The resin composition according to claim 1, wherein the thermoplastic resin has a degree of hydrogenation of 90% or more.

11. The resin composition according to claim 9, wherein the degree of hydrogenation is 95% or more.

12. The resin composition according to claim 9, wherein the degree of hydrogenation is 99% or more.

13. The resin composition according to claim 1, wherein the carbon fibers in the antistatic composition have a length of 0.5 to 10 mm.

14. The resin composition according to claim 1, wherein the carbon fibers (b) in the antistatic composition have a length of ¼ to ¹⁄₁₀ of the length of the carbon fibers (a).

15. The resin composition according to claim 1, wherein the carbon fibers (a) and (b) in the antistatic composition have a diameter of 1 to 30 μm.

16. The resin composition according to claim 1, wherein the amount of the carbon fibers (b) in the antistatic composition is 15 to 50 parts by weight.

17. The resin composition according to claim 1, wherein the carbon fibers (a) and (b) in the antistatic composition are pitch carbon fibers.

* * * * *